United States Patent [19]

Iff

[11] Patent Number: 4,696,323
[45] Date of Patent: Sep. 29, 1987

[54] PLASTIC LINED ROTATABLE VALVE

[75] Inventor: Rene Iff, Bern, Switzerland

[73] Assignee: Neotecha AG, Hombrechtikon, Switzerland

[21] Appl. No.: 771,191

[22] Filed: Aug. 30, 1985

[51] Int. Cl.⁴ ............................................. F16L 7/00
[52] U.S. Cl. .................................. 137/375; 251/174; 251/315; 251/367
[58] Field of Search ................ 137/375; 251/174, 192, 251/315, 367

[56] References Cited

U.S. PATENT DOCUMENTS

| 563,946 | 7/1896 | Wells | 251/367 |
|---|---|---|---|
| 2,014,577 | 9/1935 | MacLean et al. | 251/367 |
| 2,202,735 | 5/1940 | Johnson | 137/375 |
| 2,988,320 | 6/1961 | Kent | 251/315 |
| 3,334,650 | 8/1967 | Lowrey et al. | 137/375 |
| 3,336,939 | 8/1967 | Freed et al. | 137/375 |
| 3,394,914 | 7/1968 | Nagasato | 137/375 |
| 3,498,315 | 3/1970 | Graves et al. | 137/375 |
| 3,647,179 | 3/1972 | Scaramucci et al. | 251/315 |
| 4,071,220 | 1/1978 | Iino | 251/315 |
| 4,219,046 | 8/1980 | West et al. | 137/375 |
| 4,241,895 | 12/1980 | Sternenberg et al. | 251/174 |
| 4,304,392 | 12/1981 | Maciulaitis | 251/174 |
| 4,399,977 | 8/1983 | Wheatley | 251/315 |

*Primary Examiner*—A. Michael Chambers
*Attorney, Agent, or Firm*—Hubbard, Thurman, Turner & Tucker

[57] ABSTRACT

Disclosed is a plastic lined rotatable valve. The valve includes a valve body that is formed by at least two connected together body parts or halves. Each body half is lined with an inert plastic material. The seal between the body halves or parts is provided by sealing flanges on the plastic lining. The sealing flanges are resiliently urged together, thereby to compensate for cold flow and to isolate the sealing flanges from stresses on the valve body due to uneven piping loads. The valve body halves or parts include rims about the junction where the halves or parts are joined together which form a rigid shell for the valve body, which further isolates the sealing flanges from mechanical stresses. The valve includes a plastic encapsulated valve member that is rotatable by a plastic encapsulated stem. A packing is provided for sealing between the stem and valve body.

11 Claims, 3 Drawing Figures

PLASTIC LINED ROTATABLE VALVE

BACKGROUND OF THE INVENTION

A. Field of the Invention

The present invention relates generally to rotatable valves, and more particularly to plastic lined rotatable valves adapted for use in handling corresive materials.

B. Description of the Prior Art

Fluid handling systems necessarily include valves. Systems for use in handling corrosive materials or products that must be maintained in a high state of purity necessarily include elements, including valves, having inert internal surfaces. Some valves and systems are made of stainless steel or other corrosion resistant metalic material. Additionally, there have been developed plastic lined valves in which the internal surfaces of the valve body and the valving element have been coated with a plastic material. Fluorinated hydrocarbons such as perfluoroalkoxy resin, which is also known as PFA, have been used successfully in a large number of valves.

Rotatable valves, such as ball valves and plug valves, include a valve body that is split into at least two parts so that the ball or plug may be inserted into the valve body. The valve body parts typically include flanges that are connected together to assemble the valve body by studs or bolts. The seals between the valve body parts are provided by flanges of the plastic liner material which seal directly upon each other. The liner materials, being plastic, tend to flow under compression. Thus, the body seals of heretofore existing plastic lined valves have tended to leak after time due to flow of the material. Also, the plastic lining-to-plastic lining seal of heretofore existing plastic lined valves has tended to leak when piping loads act unevenly on the valve body. For example, if a bending load is transmitted across the valve body, the plastic liner seals on the inside of the bend are compressed and those on the outside of the bend are relaxed, thereby allowing fluid to leak.

The solution to the cold flow problem has been to provide space in which the body parts may be retightened. However, that solution is not entirely satisfactory after corrosive and possibly dangerous materials have leaked out of the valve body. There has been no satisfactory solution to the problem of leaks induced by uneven piping loads across the valve body.

Additionally, the other seals within plastic valves, including the valve seats, must also be of a corrosio resistant or substantially inert material. Typically, such seals are formed from polytetrafluoroethylene, which is better known as PTFE. The plastic seats also tend to flow and over time lose their effectiveness.

It is therefore an object of the present invention to provide a plastic lined rotatable valve that overcomes the shortcomings of the prior art. More particularly, it is an object of the present invention to provide a plastic lined valve that is not subject to leaks due to flow of the plastic liner material. It is a further object of the present invention to provide a plastic lined valve that includes means for compensating for the flow of the plastic material in the valve. It is a further object of the present invention to provide a plastic lined valve that is not subject to leak when the valve body is subjected to uneven piping loads.

SUMMARY OF THE INVENTION

Briefly stated, the foregoing and other objects are accomplished by the valve of the present invention. The valve generally includes a pair of separable body parts that are connected together. Each of the body parts includes a plastic liner with a sealing flange positioned adjacent the junction at which the body halves are connected together. When the body parts are connected together, they form a valve body including a chamber disposed between a pair of flow conduits. A stem passageway is provided between the chamber and the exterior of the valve. All of the interior surfaces of the valve body, including the chamber, flow conduits, and stem passageway are plastic lined.

Resilient means are provided for urging the sealing flanges of the plastic liners into sealing engagement with each other. Preferably, the resilient means includes a resilient gasket disposed between the sealing flange and the end of its associated body part. As the body parts are urged together by bolts or studs or the like, the gasket resiliently urges the plastic sealing flanges into sealing engagement with each other. As the sealing flange material flows over time, the resilience of the gasket compensates for the flow and maintains the seal between the plastic sealing flanges.

The valve includes a plastic encapsulated valve member positioned within the valve body chamber and a plastic encapsulated stem connected to the valve member and extending through the stem passageway. A packing arrangement is provided for sealing between the stem and the stem passageway. The valve member is preferably a rotatable valve element such as a ball or a plug. The valve member may be a half ball, which provides no dead spots between the seats, low torque, and excellent control characteristics.

The valve body parts may include axially extending rims outboard of the resilient gasket which are adapted to abut with each other when the body parts are connected together. The rims form both a metal-to-metal seal about the valve body and also provide a mechanical abuttment that isolates the plastic seals from mechanical stresses applied across the valve body.

Preferably, the seats include a resilient core as to make the seats self-adjusting to ensure a bubble-tight, low torque shut off across the full pressure range of the valve.

DESCRIPTION OF THE PREFERRED EMBODIMENT

Figure 1:
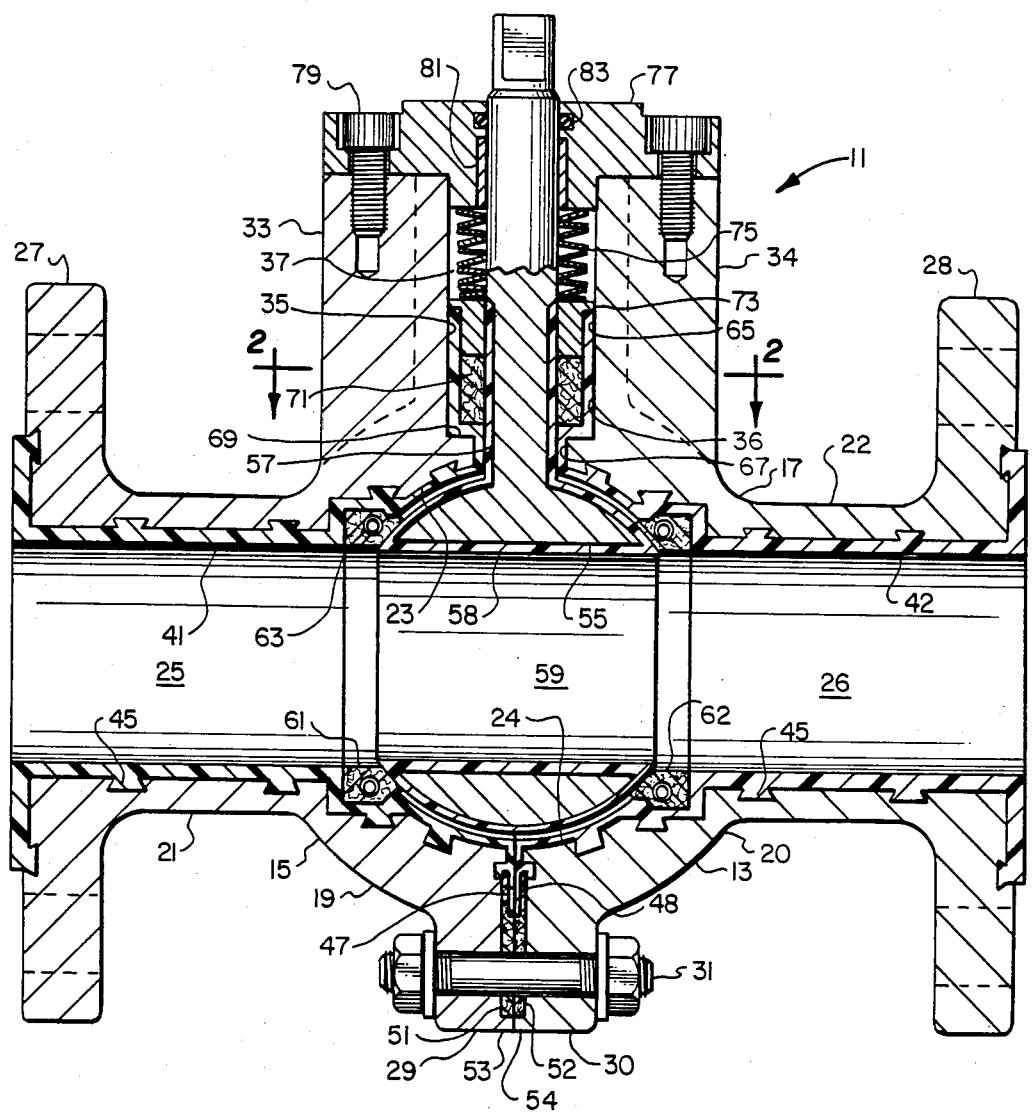
FIG. 1 is a sectional view of the valve of the preferred embodiment of the invention.
Figure 2:
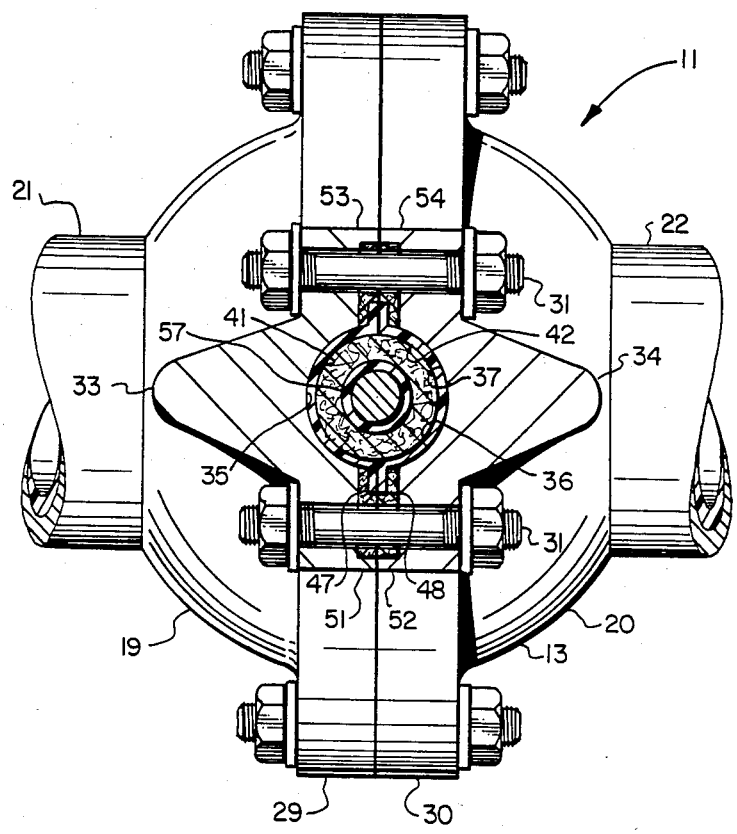
FIG. 2 is a top-sectional view taken generally along line 2—2 of FIG. 1.

Referring now to the drawings, and first to FIGS. 1 and 2, the valve of the present invention is designated generally by the numeral 11. Valve 11 includes a valve body 13 which includes a pair of body halves 15 and 17.

Body halves 15 and 17 are substantially identical. Each body half 15 and 17 includes hemispherical portions 19 and 20, respectively, and tubular portions 21 and 22, respectively. Hemispherical portions 19 and 20 include hemispherical internal surfaces 23 and 24, respectively, and tubular portions 21 and 22 define flow conduits 25 and 26, respectively. Tubular portions 21 and 22 include at their respective outer ends flanges 27 and 28 for connection to adjacent piping sections in the manner well known in the art.

Hemispherical portions 19 and 20 include at their enlarged inner ends radially outwardly extending flanges 29 and 30. Flanges 29 and 3 are adapted to be connected together by studs 31 to form valve body 13. Hemispherical portions 19 and 20 also include outwardly extending stem supports 33 and 34, respectively. Stem supports 33 and 34 include internal semicylindrical stem passageway halves 35 and 36, respectively, which when body halves 15 and 17 are bolted together, form a stem passageway 37.

The internal surfaces of body halves 15 and 17 are completely lined with plastic liners 41 and 42, respectively. Plastic liners are preferably made of a fluorocarbon plastic, which most preferably is PFA. Plastic liners 41 and 42 are interlocked with their respective body halves 15 and 17 by means of a plurality of dovetails 45. Body halves 15 and 17 are preferably formed from ductile iron and their external surfaces may be coated with a protective coating, as for example epoxy.

The inner ends of plastic liners 41 and 42 include outwardly extending sealing flanges 47 and 48, respectively. Sealing flanges 47 and 48 are spaced inwardly from the facing surfaces of flanges 29 and 30. Resilient gaskets 51 and 52 are positioned between flanges 29 and 30 and behind sealing flanges 47 and 48. As studs 31 are tightened to draw flanges 29 and 30 together, gaskets 51 and 52 resiliently urge sealing flanges 47 and 48 into sealing contact with each other. The resilience of gaskets 51 and 52 compensates for any cold flow of material in sealing flanges 47 and 48, thereby to prevent leakage over time. Resilient gaskets 51 and 52 also compensate for uneven piping loads across valve body 13. For example, if a bending stress were transmitted across valve body 13, the portions of resilient gaskets 51 and 52 on the outside of the bend would tend to relax slightly. However, due to their resilience, they continue to urge sealing flanges 47 and 48 into sealing contact with each other. Resilient gaskets are preferably made of a high temperature silicone material.

Flanges 29 and 30 also include axially inwardly extending rims 53 and 54 positioned outwardly of resilient gaskets 51 and 52. Rims 53 and 54 abut each other when studs 31 are drawn down thereby to form both metal-to-metal sealing about the exterior of vlve body 13 and a rigid unitary structure for valve body 13. Rims 53 and 54 thus cooperate to transmit piping loads across valve body 13 without effecting sealing flanges 47 and 48.

Valve 11 includes a ball valve element 55 rotatably disposed in the chamber defined by hemispherical internal surfaces 23 and 24. Ball valve element 55 includes an integral stem 57 which extends outwardly of valve body 13 through stem passageway 37. Ball valve element 55 includes a central bore 59 which is alignable with flow conduits 25 and 26 when valve 11 is open. Ball valve element is rotable through 90° to close valve 11. Valve element 55, including the internal surface of bore 59 and at least a portion of stem 57 are encapsulated in a plastic sheath 58, material, which preferably is PFA. inert plastic such as PTFE. Seat rings 61 and 62 include a totally encapsulated annual resilient core 63. Core 63 is preferably a spring and serves to make the seats self-adjusting to ensure a bubble-tight, low torque shut off for the full pressure range of the valve. The encapsulation of the spring of resilient core 63 isolates the spring from the material carried through valve 11.

Stem passageway 37 includes a large diameter portion 65 and a small diameter portion 67 with a shoulder 69 therebetween. Large diameter portion 65 forms a packing box which contains a packing sleeve 71. Packing sleeve 71 is preferably formed of an inert plastic material such as PTFE and forms a seal between stem 71 and stem passageway 37. Packing sleeve 71 is compressed between shoulder 69 and an annular packing gland 73 by means of a plurality of disk springs 75, which are loaded by a mounting flange 77. Mounting flange 77 is connected to stem supports 33 and 34 by socket screws 79. Disk springs 75 provide for uniform seal loading over the full service temperature and pressure range of valve 11. Mounting flange 77 is adapted to mount actuators or other operators to valve 11. A bushing 81 is provided in mounting flange 77 to aid in alignment of stem 57 and an O-ring 83 may be provided to prevent outside contaminants from entering valve 11.

Figure 3:
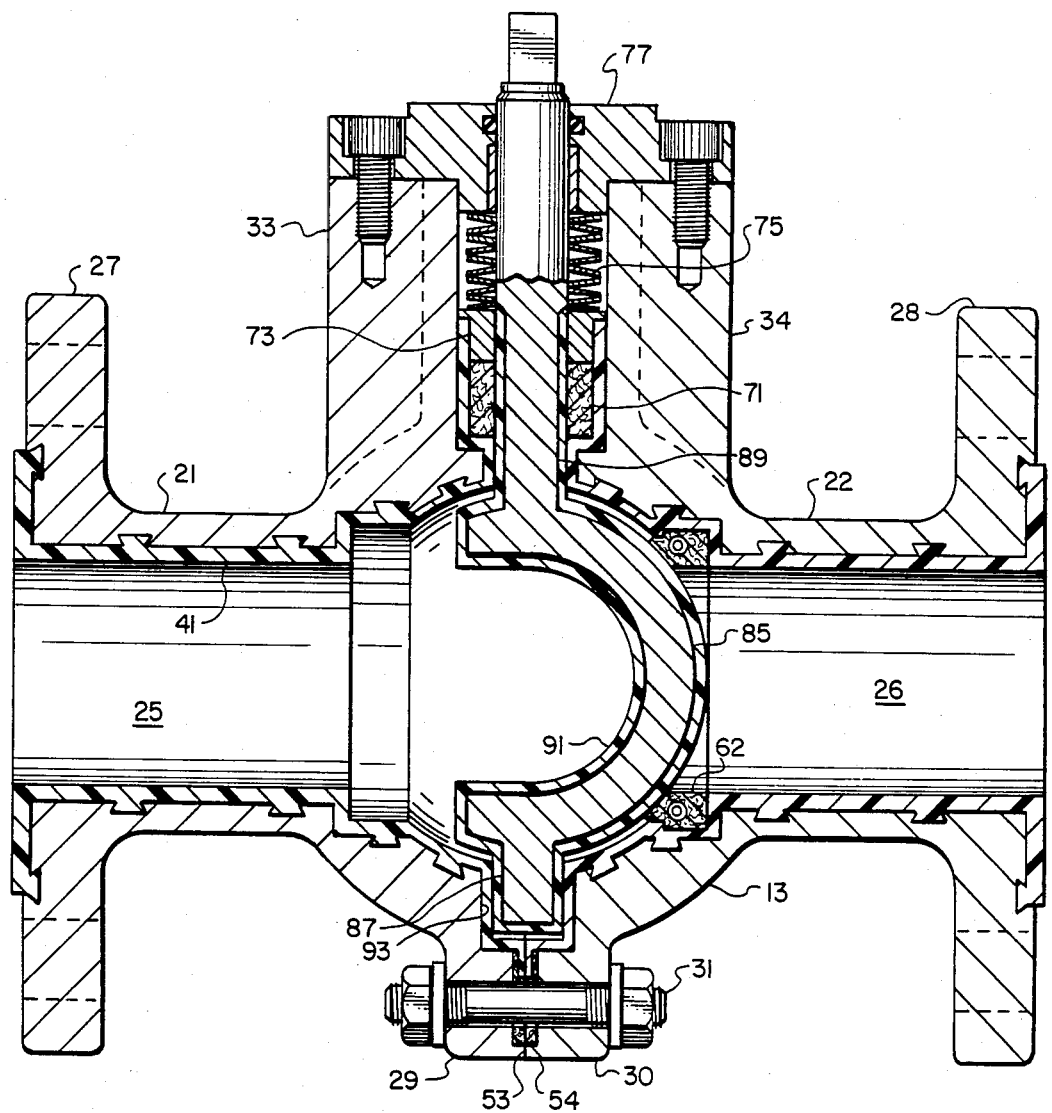
FIG. 3 is a sectional view of an alternative embodiment of the valve of the present invention.

Referring now to FIG. 3, there is disclosed an alternative embodiment of the valve of the present invention. For the most part, the valve of FIG. 3 is identical to the valve of FIGS. 1 and 2. The exception lies in the configuration of the valving element. In the embodiment of FIG. 3, the valving element includes a generally C-shaped rotatable plug 85. Plug 85 is supported within valve body 13 between an integral trunnion 87 and an integral stem 89. Plug 85, trunnion 87, and at least a portion of stem 89 are encapsulated in a plastic sheath 91. Plastic sheath 91 is preferably a fluorocarbon resin plastic, such as PFA. Trunnion 87 is supported in a socket 93 formed in flanges 29 and 30. Only a single seat ring 62 is required in the valve of FIG. 3.

The embodiment of FIG. 3 is a versatile control and shut off valve required in the valve of FIG. 3.

The embodiment of FIG. 3 is a versatile control and shut off valve for high corrosion applications. Since the design has only one seat ring, there are no cavities or dead spots for fluids or solids to collect, making the valve especially suitable for the high purity needs of the pharmaceutical industry for example. The valve of the embodiment of FIG. 3 offers high flow capacity with excellent flow control characteristics.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the form of the invention herewith shown and described is to be taken as the presently preferred embodiment. Various changes may be made in the shape, size, and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. A valve, which comprises:
   a valve body including a pair of separably body parts connected together at a junction, each of said body parts including a plastic liner with each of said liners including a sealing flange positioned adjacent said junction, said valve body including a chamber disposed between a pair of flow conduits and a stem passageway between said chamber and the exterior of said valve body, each of said body parts including axially aligned body flanges extending outwardly of said sealing flanges, each of said body flanges including axially aligned abuttment surfaces facing each other, said abuttment surfaces being positioned outwardly of said sealing flanges, at least one of said abuttment surfaces including an axially extending rim abuttable with the other of said abuttment surfaces to form a substantially rigid valve body when said body parts are connected together;

resilient means for urging said sealing flanges into sealing engagement with each other;

a plastic encapsulted valve member positioned within said valve body;

a plastic encapsulated stem connected to said valve member and extending through said stem passageway;

and means for sealing between said stem and said stem passageway.

2. The valve as claimed in claim 1, wherein said resilient means includes a resilient gasket disposed between said each of said liner flanges and the body flange associated therewith.

3. The valve as claimed in claim 1, wherein said means for sealing between said stem and said stem passageway includes:

an annular packing disposed about said stem within said stem passageway;

an annular packing gland disposed about said stem outwardly of said packing;

and means for urging said packing gland into engagement with said packing.

4. The valve as claimed in claim 1, including a seat positioned in said valve body at the intersection of said valve chamber and one of said flow conduits to seal with said valve member.

5. The valve as claimed in claim 4, wherein said seat includes an annular plastic body encapsulating a resilient core.

6. The valve as claimed in claim 1, wherein said valve chamber is generally spherical.

7. The valve as claimed in claim 6, wherein said valve member includes a ball having a flowway therethrough.

8. The valve as claimed in claim 6, wherein said valve member includes a generally C-shaped element.

9. The valve as claimed in claim 1, wherein each of said valve body parts includes a half chamber portion having one of said flow conduits connected thereto, said half chambers forming said valve body chamber.

10. The valve as claimed in claim 9, wherein each of said half chambers is generally hemispherical.

11. A valve, which comprises:

a valve body including a pair of body halves, each of said body halves including a half chamber having a first open end and a second open end with flow conduit connected thereto and a semicylindrical stem passageway half, each of said body halves including a flange extending radially outwardly from said first end, each of said body flanges including an axially extending rim;

a plastic liner covering the inside surfaces of each of said body halves, each plastic liner including a sealing flange positioned adjacent said first end of said chambers, said sealing flanges being positioned inward of said body flange rims;

means for connecting together said first ends of said half chambers to form said valve body with said rims of said body flanges in abutment with each other to form a substantially rigid body;

resilient means disposed between respective body flanges and sealing flanges for urging said plastic liner sealing flanges into sealing engagement with each other to form a plastic envelope within said valve body;

a valve element disposed in said valve body half chambers, said valve element including a stem extending through said stem passage halves, said valve element and at least a portion of said stem being encapsulated with plastic;

and packing means for sealing between said stem and said stem passageway.

* * * * *